Feb. 22, 1955 E. O. LAWRENCE 2,702,873

SCREEN STRUCTURE FOR COLOR TELEVISION CATHODE-RAY TUBES

Filed Feb. 5, 1952 2 Sheets-Sheet 1

Inventor:
Ernest O. Lawrence
by his Attorneys,
Darby & Darby

Inventor:
Ernest O. Lawrence
by his Attorneys,
Darby & Darby

United States Patent Office 2,702,873

Patented Feb. 22, 1955

2,702,873

SCREEN STRUCTURE FOR COLOR TELEVISION CATHODE-RAY TUBES

Ernest O. Lawrence, Berkeley, Calif., assignor to Chromatic Television Laboratories, Inc., New York, N. Y., a corporation of California Application February 5, 1952, Serial No. 270,060

9 Claims. (Cl. 313—78)

Figure 1:
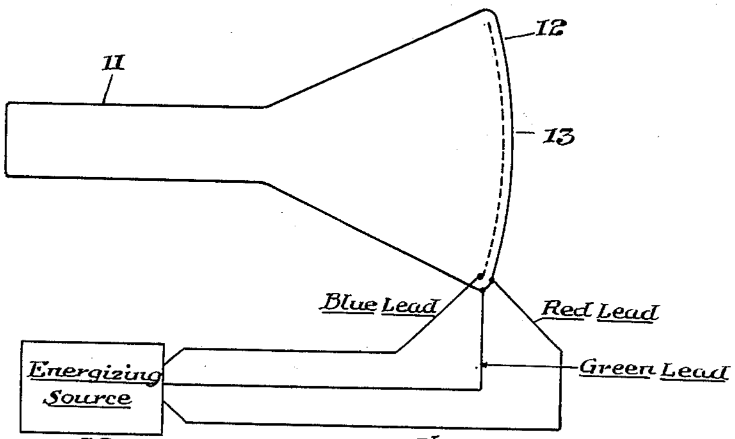

The present invention relates to cathode ray tubes for displaying television images in multiple colors and particularly to tubes for displaying such images without the necessity for interposing, between the television screen and an observer, any optical system for causing superposition of images or portions of images representative of different primary colors employed in the system.

The invention also eliminates the use of any mechanical system for separately viewing separate portions of the screen representing the several primary colors and likewise eliminates viewing the same portion of the screen through mechanically interposed filters of the respective primary colors.

In my prior application, Serial No. 150,732 for "Cathode Ray Tube for Color Television," filed March 20, 1950, there is discussed in detail the nature of a suitable polychrome television system and several types of cathode ray tubes suitable for use in such a system are disclosed. These tubes have the common characteristic that the tube screen is luminescent at one primary color upon energization by the electron beam and two sets of plates adjacent to the screen are luminescent respectively at two other primary colors, the electrical potential on these two sets of plates determining whether the electron beam shall impinge upon either set of plates or upon the screen itself.

The present invention represents an improvement over the invention of said prior application in that three sets of plates are provided and potentials applied to these three plates to alter the path of the electron beam and thus determine which of three primary colors is to be produced. In one form of my invention the three plates are purely beam path modifying or diverting electrodes and serve to determine which of three areas of the tube screen is to become luminescent. The tube screen used with this form of the invention is made up of elemental areas of the three primary colors and the electrodes divert the electron beam and cause it to impinge upon these elemental areas in a predetermined order or, in some instances, simultaneously, in proportion corresponding to the original picture transmitted.

In another form of my invention the three diverting electrodes are coated with phosphors which luminesce at the three primary colors and the tube face is either transparent or translucent. In this form the plates serve both as diverting electrodes and as emitters of light of the desired color.

The tube of the present invention has the following advantages, among others.

(1) The color display by any elemental area of the screen is controlled by purely electrical means, the potentials employed for the color control being but a few per cent of the potential for accelerating the electron beam.

(2) Any one of the primary colors may be produced instantaneously upon the screen independently of the path followed by the beam in scanning the screen. Thus absolute linearity of scan in relation to the areas of different color is not required.

(3) The tube of this invention may be utilized in either simultaneous or sequential methods of transmitting the signals representative of the different primary colors. Among the sequential systems the tube is equally applicable to use with field sequential, line sequential, dot sequential, or dot sequential multiplex system.

Apart from the screen and diverting electrode structure the cathode ray tube is of standard and well known construction. The screen structure of my present tube may be readily and simply fabricated and therefore serves to maintain the overall cost of the completed television receiver within economical limits.

As has been indicated above, the tube of the present invention includes a plurality of diverting electrodes for the electron beam which, upon the application of different electrical potentials thereto, serve either to direct the beam to areas of the screen coated with phosphors which luminesce at the three primary colors or serve to cause the beam to impinge upon the electrodes which are themselves coated with phosphors of the three primary colors.

Considering the form of the device in which the electrodes deflect the electron beam to a screen having elemental areas coated with phosphors of the different primary colors, it will be seen that the screen may be the end face of the tube envelope or may be mounted within the envelope which will, in this event, have a transparent end face. In this form of the invention the respective color portions of the screen are arranged in small elemental areas of regular shape which areas are arranged in a regular pattern. This pattern and the size of the elemental portions are so correlated to the diameter of the electron beam that the beam area covers at least one set of elemental color areas representative of all three primary colors. Improvement will be realized by having the elemental areas even smaller in relation to the beam so that two or preferably three elemental areas representative of each primary color will fall within an area covered by the cross section of the beam.

Closely adjacent to the screen and located in a particular relationship to the elemental areas of respective primary colors are three sets of diverting electrodes, the electrodes of each set being interconnected so that there is a one to one correspondence between these electrodes and the elemental areas of color. In other words, the deflecting electrodes cooperating with the elemental areas of each of the primary colors are interconnected and there are three separate sets of electrodes provided, one for each of the three primary colors. Each electrode is disposed with respect to its corresponding elemental area so as to direct electrons toward that elemental area upon suitable energization of the electrodes and to direct electrons away from the elemental area upon other energization of the electrodes. Thus these electrodes determine upon which of the elemental areas the electrons will impinge, so that for one condition of energization of the electrodes the electrons of the beam will impinge only upon the elemental areas representative of a particular primary color; for another condition of energization of the electrodes the electrons will impinge only upon areas representative of a second primary color and similarly for a third condition of electrode energization the electrons will impinge only upon elemental areas representative of a third primary color. Thus the screen may be caused to luminesce at any one of the primary colors desired under the electrical control of the diverting electrodes.

In the second form of the invention, as briefly mentioned above, the screen is transparent or translucent and the electrodes are themselves coated with phosphors which luminesce at the three primary colors. With this arrangement the application of voltages to the electrodes results in causing a desired plate to luminesce as the electrons impinge thereupon and the plates themselves form the elemental areas equivalent to the elemental areas of the screen as described in connection with the first form of the invention.

It will be understood that although in the following detailed description a system utilizing three primary colors is considered, the principles of the present invention are equally well adapted to systems using two primary colors or any desired number of colors.

Figure 2:
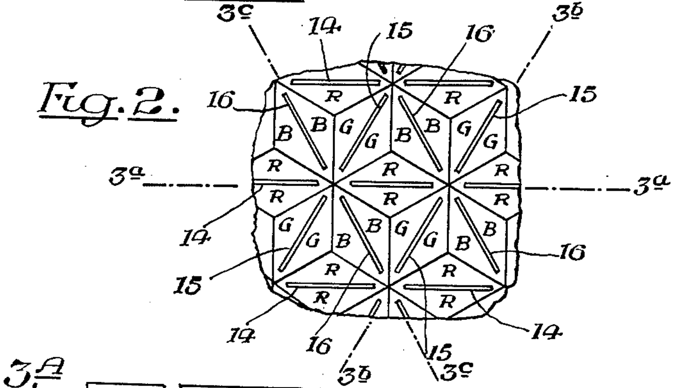
Figure 3A:
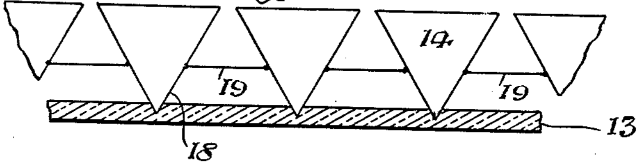
Figure 3B:
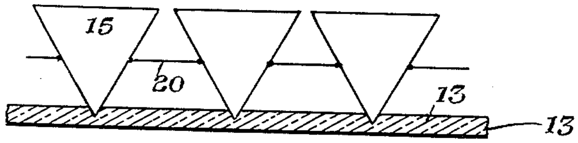
Figure 3C:
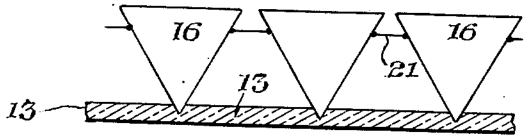
Figure 4A:
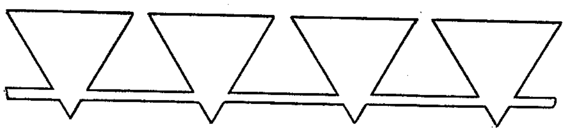
Figure 4B:
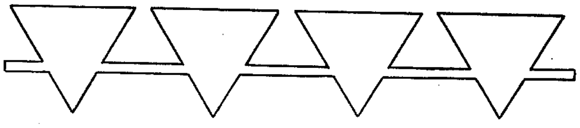
Figure 4C:
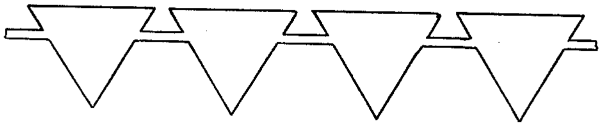
Figure 6:
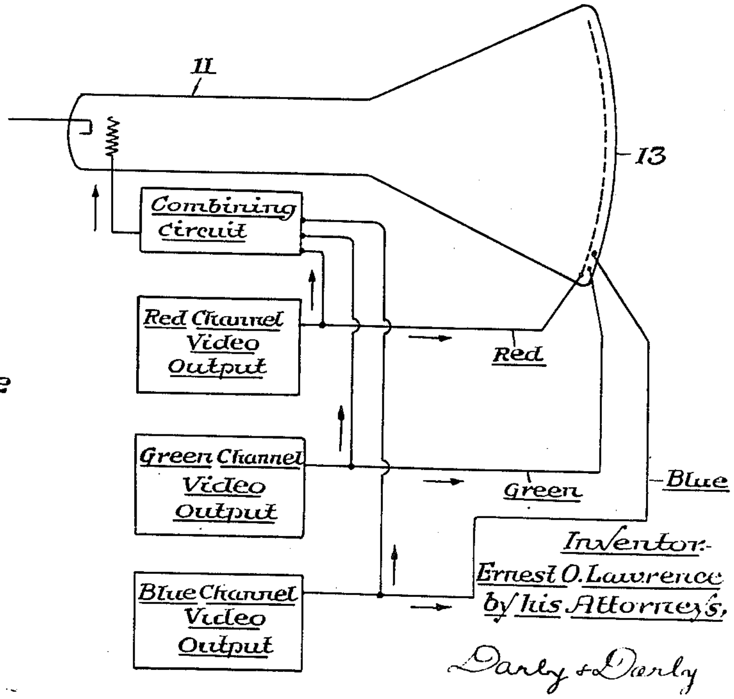
Figure 5:
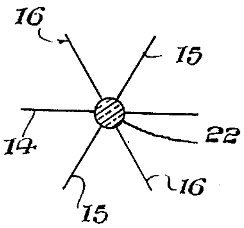

Although certain objects and advantages of the present invention have been indicated in the foregoing discussion, it will of course be obvious that other features are involved; these further objects, features and advantages of the present invention will become more fully apparent from consideration of the following description of preferred embodiments thereof when considered in connection with the appended drawings, in which, Figure 1 is a side elevation of a cathode ray tube with the screen and diverting electrode structure of the present invention represented schematically therein;

Figure 2 is a front elevational view of a screen structure in accordance with the present invention showing the arrangement otf various phosphors in a pattern and showing also the arrangement of the diverting electrodes; only sufficient of the tube screen is shown to indicate the repetitive nature of this structure and pattern;

Figure 3*a* is a cross-sectional view of the diverting electrode structure viewed along lines 3*a*—3*a* of Figure 2;

Figure 3*b* is a cross-sectional view of the diverting electrode structure viewed along line 3*b*—3*b* of Figure 2;

Figure 3*c* is a cross-sectional view of the diverting electrode structure viewed along line 3*c*—3*c* of Figure 2;

Figure 4*a* is a detailed view of one mode of fabricating the electrodes in strips showing particularly the interconnection of a plurality of electrodes by strips integral therewith;

Figure 4*b* is a view similar to Figure 4*a* showing, however, the interconnection of the electrodes at a point different from that of the electrodes of Figure 4*a* thereby permitting cross-over of these connections without interference and with sufficient spacing to properly insulate one set of electrodes from the other;

Figure 4*c* is a view similar to Figure 4*a* showing the electrodes of a third set interconnected at a point different from that of the interconnection of the sets of electrodes of Figures 4*a* and 4*b* to permit of additional cross-over of connections while maintaining proper insulation;

Figure 5 is a fragmentary rear elevational view of a plurality of electrodes showing a means for interconnecting the electrodes at their nearest points by an insulating bead of glass or the like to thereby render the entire electrode structure more rigid; and Figure 6 is a schematic diagram illustrating a means for utilizing the tube of my invention for simultaneous display of the three primary colors.

Referring now to the drawings, there is shown in Figure 1 a cathode ray tube 11 which is conventional in general configuration and which is provided with the usual electron gun, accelerating electrodes, intensity control electrode, and beam deflecting means which elements are not illustrated since any elements of conventional design may be utilized. The present invention is concerned primarily with the diverting electrode and target structure illustrated particularly in Figures 2, 3*a* through 3*c* and 4*a* through 4*c*.

Referring now to Figures 2 and 3*a* through 3*c* a transparent plate 13, preferably of glass suitable for sealing to metal, is provided. This plate may be the end face of the tube 11 forming part of the evacuated envelope thereof. If desired, however, plate 13 may be suitably supported within the tube envelope in which case the end face of the tube 11 is made transparent for the ready viewing of the plate 13. Obviously, if the form of my invention in which the deflecting electrodes carry the luminescent phosphors is utilized, the plate 13 must be transparent or translucent whether it is part of the tube envelope or is within the tube.

Mounted adjacent to and preferably contiguous with plate 13 are three series of diverting electrodes respectively designated 14, 15 and 16. As shown in Figure 2 the electrodes 14, which may be considered to be the red controlling electrodes, extend generally horizontally. The electrodes 15, which may be considered to be the green controlling electrodes, extend diagonally upward to the right and the remaining electrodes 16, which may be considered to be the blue controlling electrodes, extend diagonally downward to the right. As is clear from Figure 2, the rows of electrodes intersect to form substantially equilateral triangles. When the electrodes are uncoated, as in the first form of my invention, the screen 13 is coated with phosphors responsive to the three colors, red, blue and green. These phosphors, as shown in Figure 2, are arranged so that each of the triangles formed in front of a set of three deflecting electrodes is divided into three symmetrically arranged sub-triangles on the surface of the plate 13. Each of these three sub-triangles is coated with a phosphor of one of the three primary colors. The result is as shown in Figure 2, that is, the plate 13 is divided into elemental areas which preferably are parallelograms or diamond shaped areas representative of different primary phosphor colors. Each of these diamond areas has an electrode extending along its longer diagonal, the electrodes of a set being arranged in a triangular arrangement.

The individual electrodes may have a triangular shape as indicated in elevation in Figures 3*a*, 3*b* and 3*c*, the electrode being wider at the end closer to the source of the electrons and narrower or pointed at the end adjacent the plate 13. However, the electrodes may be rectangular and may also, if desired, be tapered to a point adjacent the screen 13, but the taper being along a convexly or concavely curved line rather than rectilinear. The narrower ends such as 18, as represented in Figures 3*a* through 3*c* may be molded into and supported by the plate 13. Alternatively they may be adjacent to the plate 13 and supported in position by a suitable supporting frame not shown.

Each of the electrodes 14, 15 and 16 is separate and distinct from the other electrodes both of the same set and of the other sets. However, all of the electrodes 14 are interconnected as are all electrodes 15 and all electrodes 16. Figure 3*a* illustrates one manner in which such an interconnection may be effected. In this view wires 19 coplanar with the row of electrodes 14 interconnect adjoining electrodes 14. The various rows of electrodes may be interconnected at their ends in any suitable manner so that the entire set of electrodes 14 is interconnected.

Similar connecting wires may be utilized for each of the sets of electrodes 15 and 16 as is clearly shown in Figures 3*b* and 3*c* respectively, wherein the wires are designated 20 and 21 respectively. In order to avoid contact between connecting wires 19, 20 and 21, the wires 19 may be adjacent the points 18 of electrodes 14 while the wires 20 may be midway of the sides of the electrodes 15 and the wires 21 adjacent the wider rearmost portions of the electrodes 16. Thus the wires at their points of cross-over are sufficiently separated to be properly electrically insulated.

As is indicated in Figures 4*a* through 4*c* the connecting wires may be replaced by strips fabricating integrally with the electrodes 14, 15, 16. For example, as shown in Figure 4*a* a complete row of electrodes may be stamped out of a single sheet of metal with strips adjoining the individual electrodes 14. Figure 4*b* shows a similar arrangement for the electrodes 15 and Figure 4*c* for the set of electrodes 16.

The electrodes may be sufficiently supported by being embedded at their tips 18 in the material of screen 13. If a further support is required it may be obtained in the manner shown in Figure 5 where an insulating bead 22 of glass or other suitable material is molded to the adjacent points of the electrodes of the various sets to maintain them rigidly in their desired relationship while insulating them one from another.

The signals applied to the diverting electrodes may be derived from the corresponding synchronizing pulses, that is, the red synchronizing pulses would be applied to the red diverting electrodes 14, the blue synchronizing pulses to the electrodes 15 and the green to the electrodes 16. As has been indicated above, the potentials required on the diverting electrodes are to a small percentage of the potentials required for accelerating the electron beam.

If, for example, the field sequential system of scanning is utilized the potentials will be first applied to the diverting electrodes to cause the electron beam to strike only the elemental areas of the screen which are coated with the red phosphor during an entire field of scan. A succeeding field of scan will be one in which the beam strikes only the blue elemental areas of the screen and the third field scan will be one in which the electron beam impinges solely upon the green elemental areas of the screen.

In like manner, if the electrodes are themselves coated with color emitting phosphors and the screen is transparent or translucent, the result will be the same, that is, the first field scan will produce solely red, the second blue, and the third green light.

In some instances it may be desirable to utilize the tube of my present invention in a simultaneous color transmission system. In order to utilize the tube in this manner a circuit similar to that schematically to that shown in Figure 6 may be utilized. In this arrangement the electron beam intensity is controlled through a combining circuit as indicated in Figure 6 and the diverting electrodes have potentials applied simultaneously thereto so that the proportion of the electron beam falling upon any particular elemental color area is in direct proportion to the amount of that color present in the original picture.

While I have described preferred embodiments of my invention it will be understood that many other modifications may be made without deviating from the principles thereof; therefore I wish to be limited not by the foregoing description, but solely by the claims granted me.

What is claimed is:

1. A cathode ray tube for the production of television images in polychrome comprising an envelope having a target area and a viewing screen, a single electron gun within said envelope for generating a beam of cathode rays for scanning said target area, a plurality of sets of diverting electrodes in said envelope, and adjacent said target area, one set for each color signal received, a plurality of sets of phosphor coated elemental areas corresponding in number to the sets of diverting electrodes, the total number of areas of each phosphor corresponding to the total number of diverting electrodes for that color, each said planar diverting electrode lying in a plane extending normal to said viewing screen with that edge thereof adjacent said screen lying within the boundaries defining the respective color area therefor, and electrical leads connected to all of said electrodes for applying diverting potentials therebetween.

2. A cathode ray tube in accordance with claim 1 characterized in that the diverting electrodes of the various sets extend at angles to the diverting electrodes of the other sets, whereby one electrode of each set forms with one electrode of each other set an equilateral triangle.

3. A cathode ray tube in accordance with claim 1 wherein the electrodes of one set extend horizontally, the electrodes of another set extend vertically upward to the left, and the electrodes of a third set extend vertically upward to the right, and wherein all electrodes lie in planes generally perpendicular to the tube face.

4. A cathode ray tube in accordance with claim 1 wherein the electrodes of one set extend horizontally, the electrodes of another set extend vertically upward to the left, and the electrodes of a third set extend vertically upward to the right, wherein all electrodes lie in planes generally perpendicular to the tube face, one electrode of each set forming with one electrode from each of the other sets an equilateral triangle, and wherein the screen area encompassed by each said equilateral triangle is divided into three sub-triangles of equal area, one of which is coated with a phosphor capable of emitting red light, a second with a phosphor emitting green light, and the third with a phosphor emitting blue light.

5. A cathode ray tube in accordance with claim 1 characterized in that all electrodes of one set are coated with materials capable of fluorescing to produce one color of light, all electrodes of a second set are coated with material capable of fluorescing to produce a second color of light and all electrodes of a third set are capable of fluorescing to produce a third color of light.

6. A cathode ray tube in accordance with claim 1 characterized in that all electrodes of one set are coated with materials capable of fluorescing to produce one color of light, all electrodes of a second set are coated with material capable of fluorescing to produce a second color of light and all electrodes of a third set are coated with material capable of fluorescing to produce a third color of light and further characterized in that the face of the tube is transparent.

7. A color television tube comprising a screen having regularly repetitive elemental areas coated with electron responsive materials adapted to produce light of different primary colors, and a plurality of diverting electrodes adjacent respectively to said areas, extending substantially perpendicularly thereto, and each positioned with the edge thereof adjacent said screen lying within the boundaries defining the respective color area therefor, all of said electrodes associated with elemental areas of each color being interconnected to form sets corresponding respectively to said colors.

8. A color television tube as claimed in claim 7 characterized in that each of said electrodes is tapered with its narrower end at said screen.

9. A color television tube as claimed in claim 7 characterized in that the interconnections between electrodes are coplanar with said electrodes and are spaced at different distances from the screen for different sets of electrodes whereby the interconnections for one set of electrodes may cross those of another while maintaining the sets insulated from each other.

References Cited in the file of this patent

UNITED STATES PATENTS

| | | |
|---|---|---|
| 2,446,249 | Schroeder | Aug. 3, 1948 |
| 2,446,440 | Swedlund | Aug. 3, 1948 |
| 2,446,791 | Schroeder | Aug. 10, 1948 |
| 2,461,515 | Bronwell | Feb. 15, 1949 |
| 2,481,839 | Goldsmith | Sept. 13, 1949 |
| 2,529,485 | Chew | Nov. 14, 1950 |
| 2,532,511 | Okolicsanyi | Dec. 5, 1950 |
| 2,577,368 | Schultz et al. | Dec. 4, 1951 |